(12) United States Patent
McIntyre

(10) Patent No.: US 7,123,787 B1
(45) Date of Patent: Oct. 17, 2006

(54) INTEGRATED PHOTONIC CIRCUITS WITH VERTICAL CONNECTIONS

(75) Inventor: Thomas J. McIntyre, Nokesville, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 11/442,796

(22) Filed: May 30, 2006

Related U.S. Application Data

(62) Division of application No. 10/608,168, filed on Jun. 26, 2003, now Pat. No. 7,079,716.

(51) Int. Cl.
G02B 6/12 (2006.01)
G02B 6/125 (2006.01)
H01L 31/0232 (2006.01)

(52) U.S. Cl. .................. 385/14; 385/131; 438/31
(58) Field of Classification Search .......... 385/14, 385/129–132
See application file for complete search history.

(56) References Cited

U.S. PATENT DOCUMENTS

| 4,521,443 | A | * | 6/1985 | Naik et al. ............... 427/526 |
| 5,066,514 | A | * | 11/1991 | Oyoshi ................... 427/526 |
| 6,890,450 | B1 | * | 5/2005 | Naydenkov et al. ....... 216/24 |
| 2003/0081922 | A1 | * | 5/2003 | Ide ......................... 385/129 |
| 2003/0081924 | A1 | * | 5/2003 | Yegnanarayanan et al. . 385/132 |

* cited by examiner

*Primary Examiner*—Michelle Connelly-Cushwa
(74) *Attorney, Agent, or Firm*—Mark Wurm

(57) ABSTRACT

An integrated photonic device having a vertical optical connection between vertically oriented waveguides and a process for making the same is disclosed. A first waveguide is patterned and etched onto an underlying substrate. A cladding layer is placed over the waveguide and substrate. The cladding layer is coated with a photoresist, and then patterned with holes that are slightly offset from the underlying waveguide. The holes are implanted with nitrogen doses at an angle. The nitrogen doses form an angled implantation of SiON. The material change and accompanying index of refraction change due to the angled implantation optically couples the underlying waveguide with an outside surface of the cladding layer. A second waveguide or circuit can then be patterned on the outer surface of the cladding and connected to the angled implantation and underlying waveguide. Multiple layers of waveguides or circuitry can be connected to each other in this manner.

5 Claims, 1 Drawing Sheet ic # INTEGRATED PHOTONIC CIRCUITS WITH VERTICAL CONNECTIONS

CROSS REFERENCE TO RELATED APPLICATION

This application is a divisional application of application Ser. No. 10/608,168 filed Jun. 26, 2003, now U.S. Pat. No. 7,079,716, the contents of which are incorporated herein by reference.

FIELD OF THE INVENTION

The present invention relates to photonic circuits, and in particular, integrated photonic circuits with optical connections between vertically disposed layers of circuits.

BACKGROUND OF THE INVENTION

Photonic circuitry is often etched onto integrated circuits that are used in communication networks. The waveguides and other components of such circuits transmit and modify optical data pulses. Unlike communication networks that use conventional conductors and the transmission of electrical pulses that can navigate the turns and bends of the conductor, optical pulses in a waveguide cannot make such tight turns and bends without unacceptable losses via attenuation and escape. Because of this inability of optical pulses to make tight turns and bends in a waveguide, it is problematic to design and manufacture photonic multi-layer integrated circuits. While it has been postulated that micro-mirrors be used to change the direction of a light path in a photonic circuit, the use of mirrors in integrated circuits poses several manufacturing and application problems.

Photonic circuitry and communication networks would benefit if optical pulses could be routed in directions that would allow multiple vertically disposed layers of integrated circuitry to be reliably connected. Such connections would require bends in the path of the light pulses, which cannot take place unaided in a typical waveguide.

SUMMARY OF THE INVENTION

The present invention is an integrated photonic circuit that has vertical connections between waveguides on separate vertically disposed planes of the circuit. The circuit consists of a first waveguide etched onto a substrate. Positioned on top of the waveguide and substrate is a cladding layer. Holes are patterned onto the cladding layer that are slightly offset from the underlying waveguides on the substrate, and nitrogen is implanted into the holes in one or more doses. The circuit is subsequently annealed to form a connecting waveguide implanted in the cladding layer that connects the underlying waveguide with the surface of the cladding layer. During the ion implantation the supporting substrate is tilted at an angle to provide an angled implant of nitrogen ions. Another waveguide can then be placed onto the cladding layer, and the angled implant channel will connect the underlying waveguide with the waveguide on the cladding surface. Because of the angled nature of the implanted connection, optic pulses can travel from the underlying circuitry, into and through the implanted area, and into the waveguide circuitry on the surface of the cladding. The implant cause a change in the refractive index of the cladding layer to match that of the waveguide to provide a travel for light.

It is therefore an object of a preferred embodiment of the present invention to optically connect vertically disposed photonic circuits in an integrated circuit.

DETAILED DESCRIPTION OF THE INVENTION

The present invention is an integrated photonic circuit that uses an angled implantation through a patterned photoresist layer to alter the refractive index of a cladding medium of the integrated circuit and allows connection between different layers, positioned one on top of another, of the integrated circuit.

Figure 1:
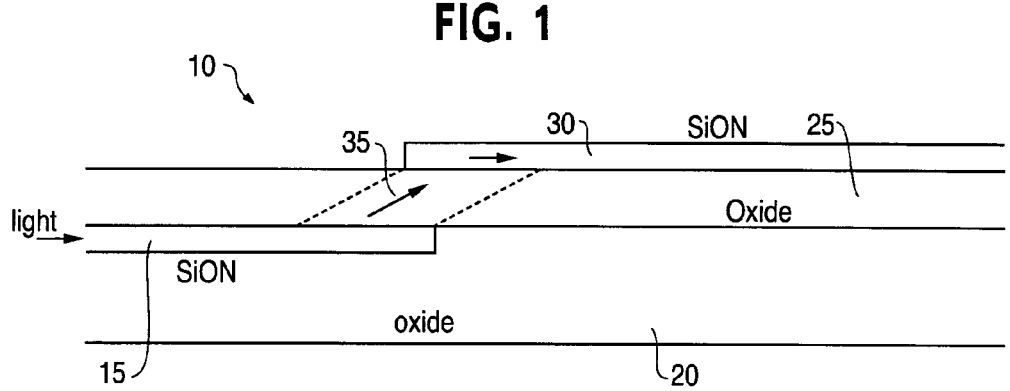
FIG. 1 is cross-sectional view of an integrated photonic circuit of the present invention.

An integrated photonic circuit 10 of the present invention having a vertical connection between vertically displaced waveguides is illustrated in FIG. 1. Photonic circuitry 15 is etched and patterned onto a substrate 20 utilizing well known microphotonic processing and fabrication techniques. A cladding layer 25 is positioned on top of the photonic circuitry 15 and substrate 20. A second layer of photonic circuitry 30 is put down on the cladding layer 25. The second photonic layer 30 is positioned so that it is slightly offset from the photonic circuitry 15 below it. An angled implantation 35 connects circuitry 15 with circuitry 30. In a preferred embodiment, the angle formed by the implantation 35 and the substrate 20 is approximately 50 degrees or less.

The integrated photonic circuit 10 of the present invention as illustrated in FIG. 1 can be manufactured by the following steps. An ordinary photonic device 10 whose circuitry 15 is integrated on a substrate 20 is made by patterning SiON onto substrate 20 using well known microphotonic manufacturing techniques. This patterning forms underlying photonic waveguide circuitry 15. In one embodiment, the substrate layer is an oxide. SiON imparts to the circuitry 15 a refractive index of around 1.6. In the embodiment in which the substrate 20 is an oxide, the refractive index of the substrate 20 is about 1.44.

Figure 2:
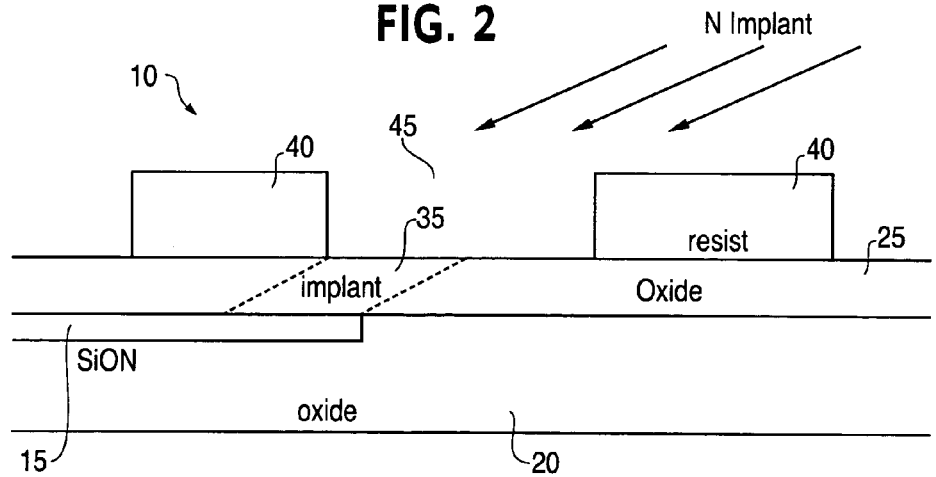
FIG. 2 is a second cross-sectional view of an integrated photonic circuit of the present invention and illustrates the manufacture of the circuit.

A cladding layer 25, which like the substrate 20 can be an oxide, is deposited on top of the photonic circuitry 15. By using an oxide, the cladding layer 25 has a refractive index that is sufficiently different from the circuitry 15 so that the cladding 25 does not interfere with the underlying circuitry 15. The cladding 25 is coated with photoresist 40 and patterned with holes 45 that are slightly offset from the waveguides of the circuitry 15 below. See FIG. 2.

After laying down the photoresist layer 40 and patterning with the offset holes 45, the photoresist 40 is developed and annealed for ion implantation. Nitrogen ions are implanted into the holes 45 at a relatively shallow angle of about 50 degrees or less. In a preferred embodiment, the nitrogen implant can be a series of differing doses and energies to get a uniform distribution of nitrogen dopant through the cladding layer 25. The implant is activated through subsequent annealing, and a SiON channel 35 is formed from the surface of cladding layer 25 to the underlying SiON waveguide 15. Because the patterning of holes 45 in the cladding layer 25 is slightly offset from the underlying waveguides 15, the resulting implant 35 is an angled channel in relation to the cladding layer 25.

The angled implantation step changes the refractive index of the cladding layer 25, at the point of the offset holes 45, to equal that of the underlying photonic waveguide 15, and physically and optically connects the surface of the cladding layer 25 to the underlying waveguide 15. At this point another layer of photonic waveguide circuitry can be positioned on the integrated device 10 so that the angled channel connects the underlying waveguide 15 with the new waveguide. This process can be repeated to optically connect as many vertically disposed layers of photonic circuitry as a particular application calls for.

While the invention has been described in its preferred embodiment, it is to be understood that the words used are words of description rather than limitation and that changes may be made within the purview of the appended claims without departing from the true scope and spirit of the invention in its broader aspects.

The invention claimed is:

1. A process to manufacture an integrated photonic device, said photonic device comprising vertically disposed waveguides optically connected by an angled implantation, comprising the steps of:

patterning and etching a photonic waveguide onto a substrate;

putting down a cladding layer over said waveguide and substrate;

coating said cladding layer with a photoresist;

patterning said photoresist with holes, said holes being slightly offset from said waveguide;

implanting nitrogen into said holes;

stripping said photoresist; and annealing said nitrogen, said annealing activating said nitrogen and forming a SiON angled channel connecting said waveguide with an outer surface of said cladding.

2. The process to manufacture an integrated photonic device according to claim 1, wherein said channel forms an angle of about 50 degrees with said substrate.

3. The process to manufacture an integrated photonic device according to claim 1, wherein said channel forms an angle of less than 50 degrees with said substrate.

4. The process to manufacture an integrated photonic device according to claim 1, wherein said nitrogen is injected into said holes in two or more doses.

5. The process to manufacture an integrated photonic device according to claim 1, further comprising the step of putting down a second waveguide on said outer surface of said cladding, said second waveguide being optically coupled to said channel and said photonic waveguide.

* * * * *